United States Patent [19]
Takimoto et al.

[11] Patent Number: 5,781,267
[45] Date of Patent: Jul. 14, 1998

[54] ANTI-FERROELECTRIC LIQUID CRYSTAL WITH BLACK DISPLAY IN ONE FRAME, WHITE IN OTHER AND RATIO GIVING GREY SCALE

[75] Inventors: Akio Takimoto; Junichi Hibino, both of Neyagawa; Hisahito Ogawa, Nara, all of Japan

[73] Assignee: Matsushita Electric Industrial Co., Ltd., Osaka, Japan

[21] Appl. No.: 950,310

[22] Filed: Oct. 14, 1997

Related U.S. Application Data

[63] Continuation of Ser. No. 787,324, Jan. 28, 1997, abandoned, which is a continuation of Ser. No. 431,324, Apr. 28, 1995, abandoned.

[30] Foreign Application Priority Data

May 2, 1994 [JP] Japan .................................. 6-093191

[51] Int. Cl.$^6$ ...................................................... G02F 1/13
[52] U.S. Cl. .................................. 349/174; 349/37; 349/28
[58] Field of Search ................................ 359/72; 349/25, 349/30, 174, 37, 28

[56] References Cited

U.S. PATENT DOCUMENTS

| | | | |
|---|---|---|---|
| 5,329,390 | 7/1994 | Fujiwara et al. | 359/67 |
| 5,384,649 | 1/1995 | Takimoto et al. | 359/67 |
| 5,481,320 | 1/1996 | Konuma et al. | 348/751 |

FOREIGN PATENT DOCUMENTS

| | | |
|---|---|---|
| A-0 552 492 | 7/1993 | European Pat. Off. |
| 5-333367 | 12/1993 | Japan ................................ 359/72 |
| 6-27483 | 2/1994 | Japan |

OTHER PUBLICATIONS

T. Masuda, "Linear and Nonlinear Operations of Optically addressed . . . ", Japanese Journal of Applied Physics, vol. 33, No. 4A, Apr. 1994, Tokyo JP, pp. 1523–1525.

T. Oyama, "Tristable Operation of Antiferroelectric Liquid Crystal . . . ", Japanese Journal of Applied Physics, vol. 32, No. 5A, May 1993, Tokyo JP, pp. 1668–1670.

*Primary Examiner*—William L. Sikes
*Assistant Examiner*—Kenneth Parker
*Attorney, Agent, or Firm*—Morrison & Foerster LLP

[57] ABSTRACT

The present invention provides a spatial light modulator comprising a photoconductor having a current rectifying function and a liquid crystal layer having an antiferroelectric phase as a phase of the liquid crystal located between a pair of transparent electrodes, having a wide viewing angle and high-speed response, capable of reproducing a light-input dynamic picture including half-tone display, and being stable and reliable. Moreover, a liquid crystal display device which can be downsized by comprising a spatial light modulator, comprises a photoconductor having current rectifying function and a liquid crystal layer having the anti-ferroelectric phase as a phase of the liquid crystal located between a pair of transparent electrodes, a display device to input light to the photoconductor and a power source to apply the driving voltage to the spatial light modulator can be provided.

20 Claims, 13 Drawing Sheets

FIG. 9 (a)
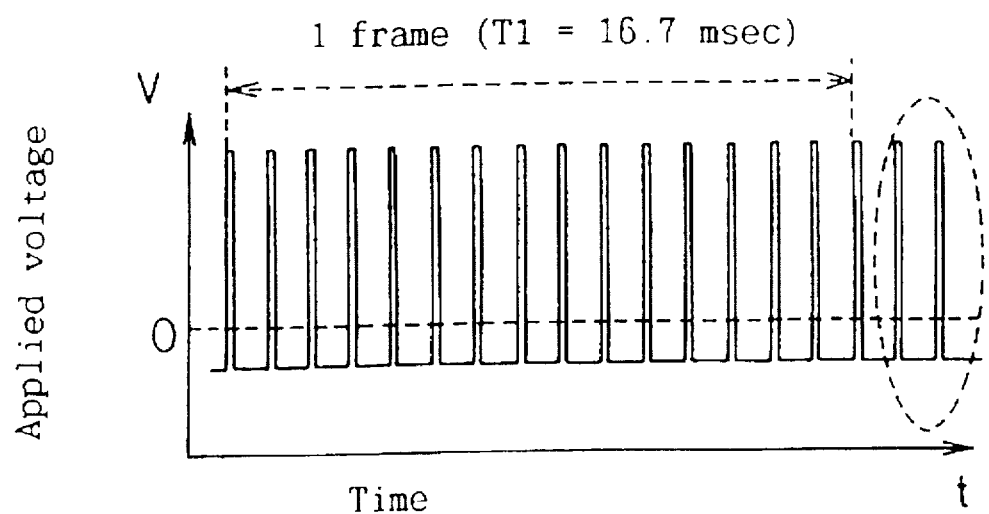
FIG. 9 (b)
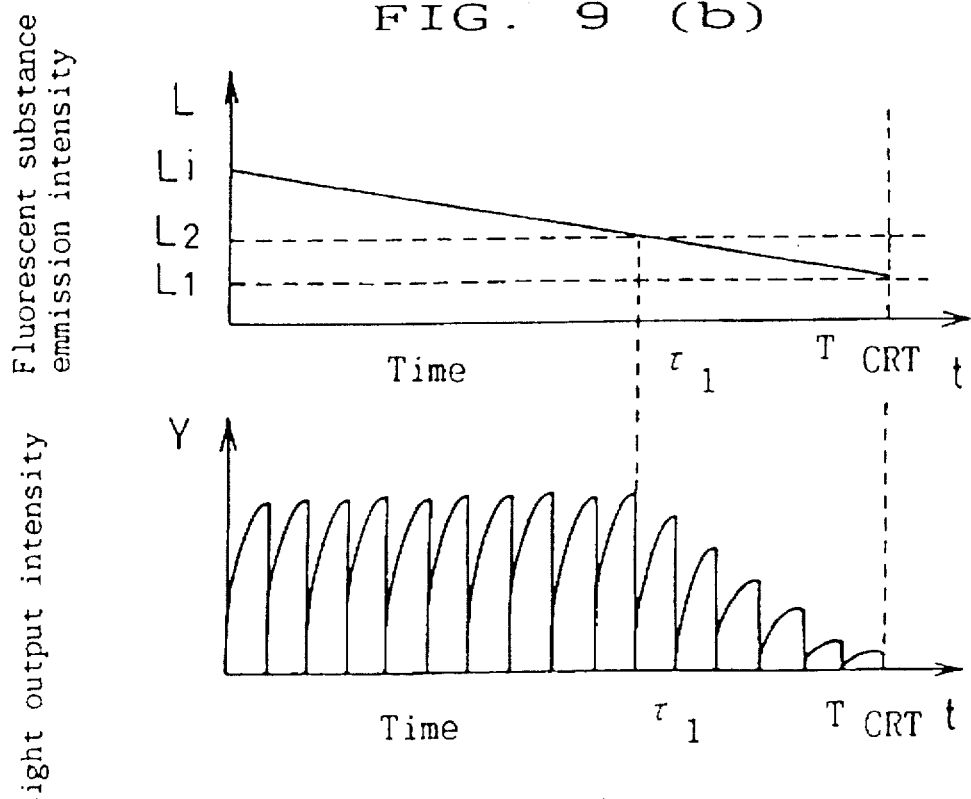
FIG. 9 (c)

0 mW/cm²

0.4 mW/cm²

0.6 mW/cm²

0.8 mW/cm²

ANTI-FERROELECTRIC LIQUID CRYSTAL WITH BLACK DISPLAY IN ONE FRAME, WHITE IN OTHER AND RATIO GIVING GREY SCALE

This application is a continuation of application Ser. No. 08/787,324, filed Jan. 28, 1997, now abandoned, which is a continuation of application Ser. No. 08/431,324, filed Apr. 28, 1995, now abandoned.

FIELD OF THE PRESENT INVENTION

The present invention relates to a spatial light modulator and a liquid crystal display device which can be applied to displaying a dynamic picture or a static picture in a projection television set which displays a dynamic picture with high luminance in a large plane.

BACKGROUND OF THE INVENTION

A liquid crystal display device comprising a liquid crystal, specifically comprising a nematic liquid crystal, has been practically used in various kinds of products. However, since the response of nematic liquid crystals is slow, accomplishing a faster speed for improvement of the display quality has been desired. For that objective, a ferroelectric liquid crystal (hereinafter abbreviated FLC) can provide a response speed of shorter than scores of μ sec by applying voltage due to spontaneous polarization. Further, it was found that the bistable state can be realized by sealing a ferroelectric liquid crystal within a thickness sufficiently narrower than the pitch length to the twisted orientation of the thickness less than scores of μm when applied as a display method, as disclosed in Clark et al. in Appl. Phys. Let., 36,899 in 1980, Japanese Patent Application Laid Open Application No. 107216/1981, and U.S. Pat. No. 4,367,924. The method is named the surface stabilizing mode and it is known that a liquid crystal display devices using this method exhibits a memory function as well as the high-speed response characteristics. The memory function enabled the two-dimentional display with an element having a simple structure by a simple driving method. However, since the indicated value of each pixel is shown in the binary display of black and white corresponding to the two stable orientations of the ferroelectric liquid crystal, it is very difficult to apply the method to a half-tone display device such as a television image. Therefore, methods to achieve multi-gradation display by means of such as area gradation by driving finely divided pixels, or time-shared drive have been discussed but such methods have not realized a display of satisfactory quality.

A display device using an antiferrlelectric liquid crystal (hereinafter abbreviated ALC) has been developed in place of the FLC display device as disclosed in Chandani et al. in Jpn. J. Appl. Phys., 27, L729 in 1988. The display device utilizes switching among three states of the stable antiferroelectric state and two ferroelectric states generated by electric field incution. In the phase transition between the antiferroelectric phase and the ferroelectric phase, the threshold value is steep with respect to the amount of the applied voltage. Further, the device has a hysteresis characteristic in terms of the optical characteristic to provide a memory function preserving each of the three states. The ALC is expected to provide a liquid crystal display material to achieve the high speed response and a multi-value display.

In recent years, a dynamic picture display device realizing high density, high resolution and high luminance in a large image plane has been desired. In order to achieve the device, both of the method of using conventional cathode ray tube and the method of using a liquid crystal display device are prospective. In the former case of the projection method using a cathode ray tube as the projection tube, there is a task that high density and high resolution are incompatible. Namely, in order to obtain a picture with high resolution, the electron beam should be reduced resulting in curbing the luminance. In the latter case of the liquid crystal display device using a device comprising a thin film transistor and a liquid crystal for projection, there is the same technological task as the above-mentioned that realizing high density and high resolution results in the lowered numerical aperture and luminance. A method having the advantages of the both methods has been proposed by Hughes Aircraft Co., Ltd. as disclosed in the Japanese Patent Laid Open Application No. 1387165/1978. The method provides a light-amplified output image by providing a high resolution dynamic picture of a low luminance from the cathode ray tube to the light modulation element as the input information irradiating the reading light having a high luminance to the liquid crystal layer for modulation. Further, in order to achieve a high-speed response, we have proposed a light modulation element comprising an FLC in the liquid crystal layer and the liquid crystal display device using the same. Also by using the light-image writing with FLC, we have found out the method of half-tone display which was considered to be difficult. The projection system has an advantage of forming an image of high light utilization efficacy due to the wide viewing angle characteristic of the FLC. Further, by the combination of the high speed response characteristic of the FLC and a new half-tone display method, accurate reproduction of the dynamic images provided by the light input from a cathode ray tube including half-tone has been enabled.

In principle, the FLC has a spontaneous polarization and the half tone modulation is controlled by the amount of the electric charge maintained at the electrodes having the liquid crystal therebetween. Thus there was a problem that the FLC easily responded to a change in the amount of the maintained electric charge. Therefore reduction of the extra electric charge is necessary. Further, the FLC has a shortcoming that the orientation can be easily disordered by outside mechanical shock.

SUMMARY OF THE INVENTION

In order to solve the conventional problems, an objective of the present invention is to provide a stable and reliable spatial light modulator comprising a photoconductor and a liquid crystal layer having a wide viewing angle and a high-speed response, capable of reproducing the light-input dynamic picture including half-tone display and a compact liquid crystal display device comprising the spatial light modulator.

To solve the above-mentioned problems, the spatial light modulator of the present invention comprises a photoconductor having a current rectifying function and a liquid crystal layer having the antiferroelectric phase as a phase of the liquid crystal placed between a pair of transparent electrodes.

In the above-mentioned structure, it is preferable that a plurality of small metal thin films electrically isolated from each other are placed between the photoconductor and the liquid crystal layer.

It is also preferable that the photoconductor comprises a groove part in the portion not having the small metal thin films thereon, further having metal thin film at the bottom of the groove part.

It is further preferable that the small metal thin films at the bottom of the groove part have insulating films underneath.

It is also preferable that a dielectric reflector comprising a multi-layer film of thin films having different dielectric constants is placed between the photoconductor and the liquid crystal layer.

When irradiating light to the photoconductor of the spatial light modulator comprising a photoconductor having a current rectifying function and a liquid crystal layer having the antiferroelectric phase as a phase state of the liquid crystal located between a pair of transparent electrodes in the spatial light modulator of the present invention, it is preferable to have a means to input light with a light intensity sufficient to provide a voltage sufficient to cause the phase transition from the antiferroelectric phase to the ferroelectric phase in the period in which the voltage is applied to the polarity reverse to the current rectifying characteristic of the photoconductor.

In the spatial light modulator of the present invention comprising a photoconductor having a current rectifying function and a liquid crystal layer having the antiferroelectric phase located between a pair of transparent electrodes, it is preferable that the voltage applied between the transparent electrodes has a unit cycle comprising the writing voltage period in which a voltage sufficient to cause phase transition of the liquid crystal layer from the antiferroelectric phase to the ferroelectric phase of the liquid crystal layer is applied to the polar reverse to the current rectifying characteristic of the photoconductor and the erasing voltage period in which a voltage sufficient to cause phase transition from the ferroelectric phase to the antiferroelectric phase of the liquid crystal layer is applied to the polarity forward to the current rectifying characteristic of the photoconductor.

The liquid crystal display device of the present invention comprises at least a spatial light modulator comprising a photoconductor having a current rectifying function and a liquid crystal layer which has the antiferroelectric phase as a phase state of the liquid crystal placed between a pair of transparent electrodes, and a display device to input light to the photoconductor and the power source to apply the driving voltage to the spatial light modulator.

In the above-mentioned structure, it is preferable to have a means to input light to provide the frequency of the driving voltage of the spatial light modulator which is greater than the display frequency of the liquid crystal display device.

In the above-mentioned structure, it is also preferable that the display device to input light is a liquid crystal display or a cathodray tube of thin film transistor drive.

It is also preferable to locate a polarizing plate so that the liquid crystal orientation state to apply minimum reflection light intensity is the antiferroelectric phase when the linearly polarized light from the polarizing plate which is polarized to a certain direction is irradiated and incident on the liquid crystal layer of the spatial light modulator and the reflected light from the spatial light modulator is read via the polarizing plate located to orient the reflected light orthogonal to the polarizing plate.

It is further preferable that the liquid crystal display device of the present invention comprises a means of gradation display by the increase of the ratio of the ferroelectric phase in the mixed phase of the antiferroelectric phase and the ferroelectric phase according to the increase of the light intensity irradiated to the photoconductor.

In the above-mentioned structure, since the photoconductor having the current rectifying function and the liquid crystal layer having the antiferroelectric phase as a state of the liquid crystal are placed between a pair of the transparent electrodes, a stable and reliable spatial light modulator having a wide viewing angle and a high-speed response, capable of reproducing the light-input dynamic picture including half-tone display can be achieved. The liquid crystal layer having the antiferroelectric phase can be a liquid crystal layer mainly comprising an antiferroelectric liquid crystal or a liquid crystal layer having a mixed phase comprising an antiferroelectric phase and a ferroelectric phase.

The voltage applied between the transparent electrodes has a unit cycle in driving comprising the writing voltage period in which a voltage sufficient to cause phase transition from the antiferroelectric phase to the ferroelectric phase of the liquid crystal layer is applied to the polar reverse to the current rectifying characteristic of the photoconductor and the erasing voltage period in which a voltage sufficient to cause phase transition from the ferroelectric phase to the antiferroelectric phase of the liquid crystal layer is applied to the polar forward to the current rectifying characteristic of the photoconductor.

Light with a light intensity sufficient to provide a voltage sufficient to cause phase transition from the antiferroelectric phase to the ferroelectric phase in the period in which the voltage is applied to the polarity reverse to the current rectifying characteristic of the photoconductor is irradiated to the photoconductor of the spatial light modulator.

A polarizing plate is placed so that the liquid crystal orientation state to apply minimum reflection light intensity is the antiferroelectric phase when the linearly polarized light from the polarizing plate which is polarized to a certain direction is irradiated and incident on the liquid crystal layer of the spatial light modulator and the reflected light from the spatial light modulator is read via the polarizing plate located to orient the reflected light orthogonal to the polarizing plate.

Further, the process of obtaining dynamic pictures in half-tone display by the spatial light modulator with light writing method comprising a photoconductor having a current rectifying function and a liquid crystal layer having the antiferroelectric phase located between a pair of transparent electrodes in the following three principles of the light modulation, namely, the half-done display principle and the dynamic picture display principle.

(1) Light Modulation Principle

FIG. 3 illustrates an example of the light intensity change of the modulated light output from the liquid crystal layer linearly polarized when passing through with respect to the voltage applied to the antiferroelectric liquid crystal layer. The output light has hysteresis with respect to the applied voltage. In the example of FIG. 3, the phase of the liquid crystal is the antiferroelectric phase in the low voltage between 0 V and 17 V but in the high voltage region above the threshold value ($V_{th}$ (H)) of 17 V, the phase changes to the ferroelectric phase. Then as the voltage lowers, the phase transition from the ferroelectric phase to the antiferroelectric phase occurs at the lower threshold value ($V_{th}$ (L)) of 6 V. The transition occurs as well when the polar of the applied voltage is reversed.

Herein the polarizer and the analyzer are located orthogonally so that the minimum output light is provided in the state of the antiferroelectric phase. Namely, black display is provided in the antiferroelectric phase when a low voltage is applied and white display is provided in the ferroelectric phase when a high voltage is applied. Since in the antiferroelectric phase, each molecule in the layer is located to offset the spontaneous polarization, it provides a stable orientation with respect to the change of electric charge in the vicinity of the polar. Therefore by using the antiferroelectric phase to the black display, a display with a high contrast can be obtained. Since the change of the output light becomes symmetrical with respect to the polarity of the applied voltage, the display stable to the three directions, in the three regions of b'-a-b, c-d and c'-d' in FIG. 3 can be obtained.

To the antiferroelectric liquid crystal, the voltage illustrated in FIG. 4 is applied for driving. One cycle comprises the first period in which a voltage greater than the threshold value $V_{th}$ (H) is applied to cause phase transition from the antiferroelectric phase to the ferroelectric phase and the second period in which the voltage smaller than the threshold value $V_{th}$ (L) is applied to cause the phase transition from the ferroelectric phase to the antiferroelectric phase. As the hysteresis characteristic indicates, in the first period display indicates white and in the second period display indicates black. Consequently, white display and black display generate alternately according to the change of the voltage value as illustrated in FIG. 5.

The output obtained by irradiating light to a photoconductor of the device having laminated structure of a photoconductor 105 illustrated in FIG. 1 and FIG. 2 and the above-mentioned antiferroelectric liquid crystal layer 118 by applying a driving voltage as illustrated in FIG. 4 will be explained hereinafter. In the first voltage applying period, voltage is applied in the reverse direction with respect to the current rectifying characteristic. In this case the spatial light modulator of the FIG. 1 becomes an equivalent circuit of FIG. 6. An applied voltage higher than $V_{th}$ (H) will be divided into a voltage $V_a$ to be applied to the photoconductor and a voltage $V_f$ to be applied to the antiferroelectric liquid crystal layer. Electric charge generated by light irradiation causes the flow of the light current $I_{ph}$, resulting in reducing $V_a$ and increasing $V_f$. In the second voltage applying period, as illustrated in the current rectifying characteristic of FIG. 7, a large current with respect to the light irradiation is generated to increase $V_f$. FIG. 8 illustrates the change of $V_f$ and the output light when light intensity is changed with a steady light irradiation. With no light irradiation illustrated in FIG. 8(a), in the first voltage applying period, $V_f$ becomes less than $V_{th}$ (H) maintaining the antiferroelectric phase to always display black. With light irradiation illustrated in FIGS. 8(b), 8(c), 8(d), in the first voltage applying period, electric charge generated in the photoconductor increases by the light absorption accompanying the increase of $V_f$. And when $V_f$ exceeds $V_{th}$ (H), the liquid crystal changes the phase to display white in the ferroelectric phase. In the second voltage applying period, $V_f$ is over $V_{th}$ (L) with respect to the light irradiation intensity to change the phase of the liquid crystal to the antiferroelectric phase to display black.

(2) Half Tone Display Principle

In the first voltage applying period, timing of the phase transition depends on the light intensity of the irradiated light. Namely, as the light irradiation is intensified, $V_f$ reaches and exceeds the threshold value $V_{th}$ (H) faster to start the phase transition of the liquid crystal. When the unit cycle of driving is set to be a short time with respect to the intensity change of the light irradiation, the time average of the first period of white display and the second period of black display will be displayed. Therefore the output light intensifies with respect to the time average according to the irradiated light intesity increase. By this function a half-tone display is enabled. A liquid crystal having a mixed phase of the antiferroelectric phase and the ferroelectric phase as a phase state of the liquid crystal will be discussed. The threshold value depends on the mixing ratio of the mixed phase. Namely, the increase of the antiferroelectric phase ratio causes the increase of $V_{th}$ (H). Therefore, a smooth rising characteristic with respect to the light irradiation can be achieved.

(3) Dynamic Picture Display Principle

The case when a light information input to the spatial light modulator is a dynamic picture displayed by a television signal of 16.7 msec per one picture and is to be written to the device will be discussed. As illustrated in FIG. 9(a), when one cycle of the applied voltage is 1 msec, light-writing in the first period and erasure in the second period are alternately repeated for approximately 17 times for one picture. For example, when a picture is written by a cathode ray tube, the time change in a point of the picture is as illustrated in FIG. 9(b) depending on the emission characteristic of the fluorescent substance, but the output light of the spatial light modulator will be as illustrated in FIG. 9(c) reproducing the emmission from the fluorescent substance.

BRIEF DESCRIPTION OF THE DRAWINGS

FIGS. 9(a)–9(c) illustrate the light writing method for the dynamic picture display of one embodiment of the present invention.

BRIEF DESCRIPTION OF THE INVENTION

The present invention will be further illustrated with reference to the accompanying concrete examples.

Figure 1:
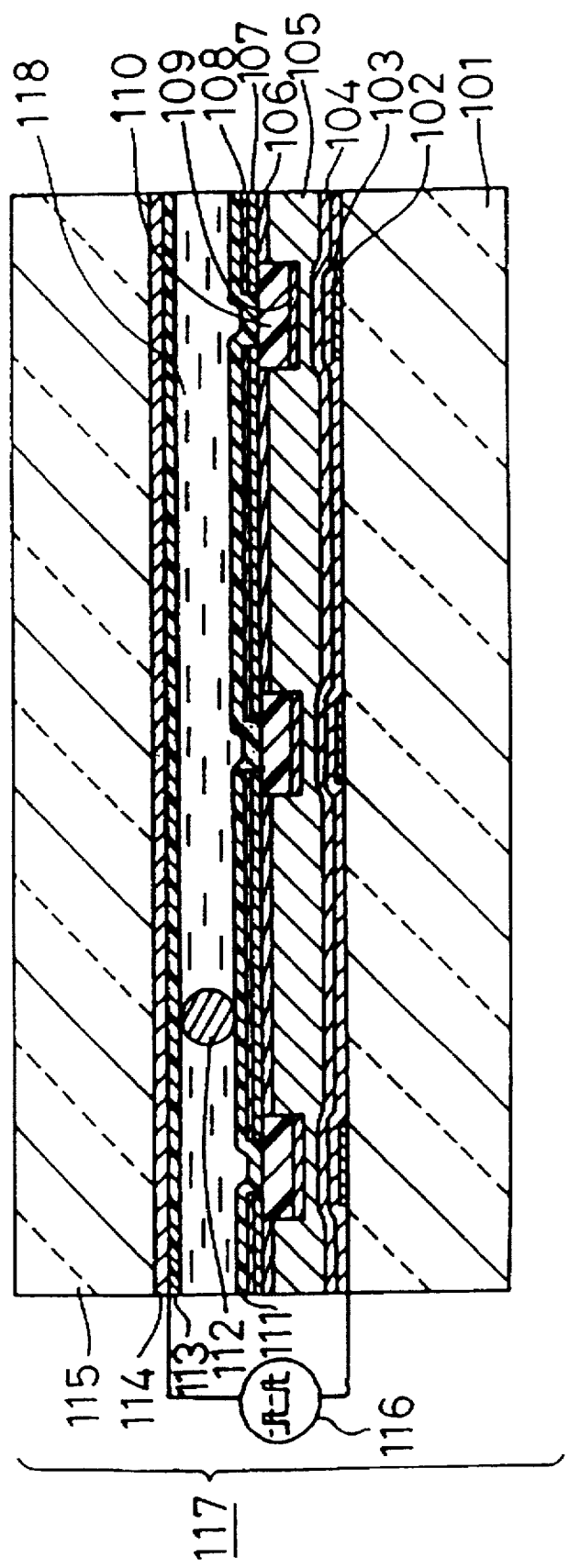
FIG. 1 is a diagrammic section view of one embodiment of the spatial light modulator of the present invention.
Figure 2:
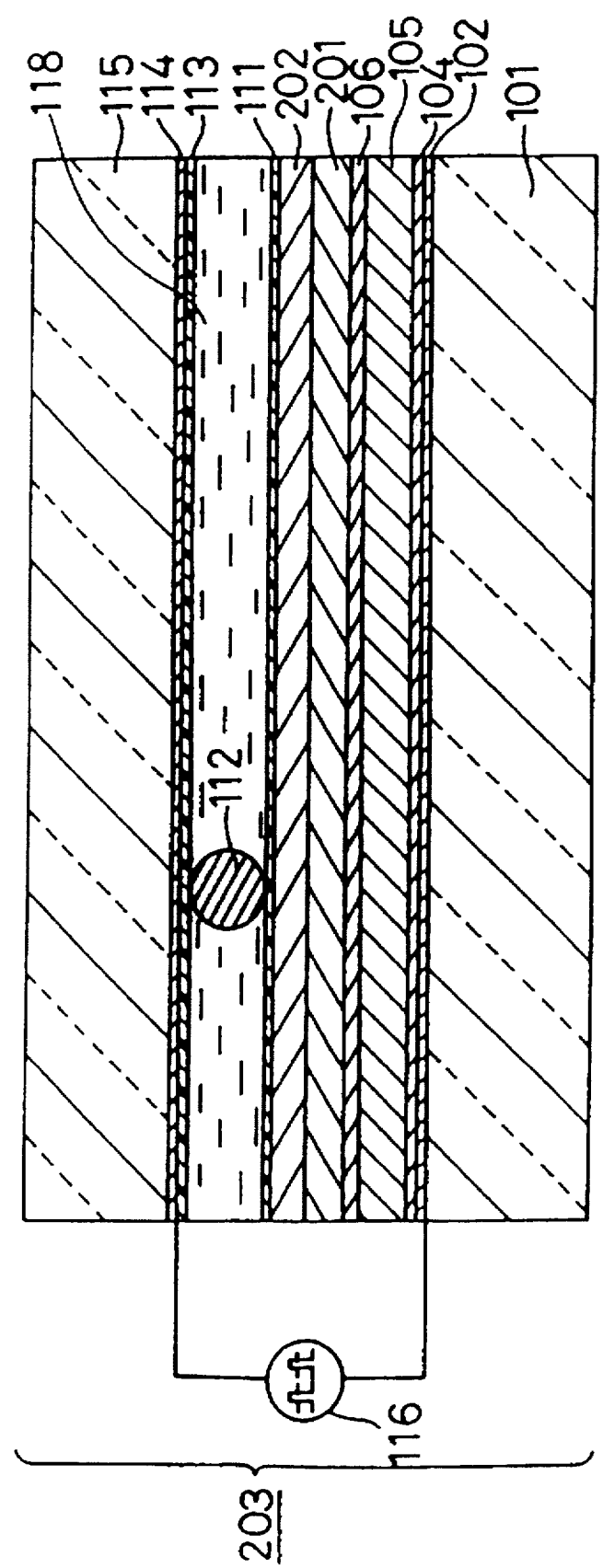
FIG. 2 is a diagrammic section view of another embodiment of the spatial light modulator of the present invention.
Figure 3:
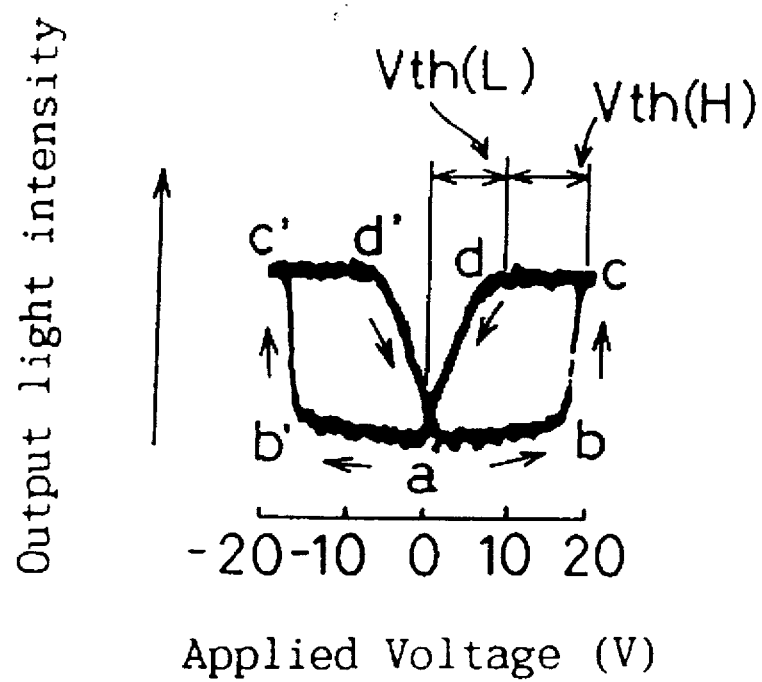
FIG. 3 illustrates the hysteresis characteristic of the reflection ratio of an antiferroelectric liquid crystal with respect to the applied voltage of the present invention.

Embodiments of a spatial light modulator comprising a photoconductor with a current rectifying function and a liquid crystal layer having the antiferroelectric phase as a phase placed between a pair of transparent electrodes are illustrated in FIG. 1 and FIG. 2.

FIG. 1 illustrates an embodiment of the structure having a plurality of small pixel reflecting films (metal thin film) 108 electrically isolated from each other between the photoconductor 105 and the liquid crystal layer 118. Examples of the photoconductor having current rectifying function 105 include amorphous silicon containing hydrogen (hereinafter abbreviated a-Si:H). The thickness of the photoconductor 105 is preferably from 0.2 to 10 µm. An i-type a-Si:H layer (photoconductor) 105 and an n-type a-Si:H layer 106 are further formed between the p-type a-Si:H layer 104 and the liquid crystal layer 118 to form a diode structure with a three-consecutive layer of a p-type a-Si:H layer 104, an i-type a-Si:H layer 105 and an n-type a-Si:H layer 106.

The photoconductor 105 is divided into pixels. Metal thin films 108 serve as reflection films together with pixel electrodes 107 to reflect the reading light. An inter-pixel portion comprises a groove structure having a metal thin film as an output blocking film (metal thin film) 109 at the bottom and filled with the polymethyl methacrylate (PMMA) film including 30 weight % of dispersed carbon black 110. The groove structure prevents the diffusion of the electric charge between the pixels and the faulty operation caused by the leakage of the reading light irradiated to the pixels into the photoconductor. Underneath the photoconductor 105 are input blocking films 103 to allot the input light to the pixels. The liquid crystal layer 118 is sandwitched between polymer films treated with rubbing method to have the orientation to the same direction to orient the antiferroelectric liquid crystal 111, 113. Since it is reflection mode, the optimum thickness of the liquid crystal layer 118 is the half of the optical path length when the maximum modulation rate is obtained with respect to the refractive index of the liquid crystal. By providing spacers 112 having the particle size of the same length as the optimum film thickness, the liquid crystal film thickness is secured. As the spacer 112, a material such as silicon oxide can be used. The average diameter of the spacer 112, that is, of the liquid crystal film thickness, is preferably from 0.5 to 8 µm.

Figure 4:
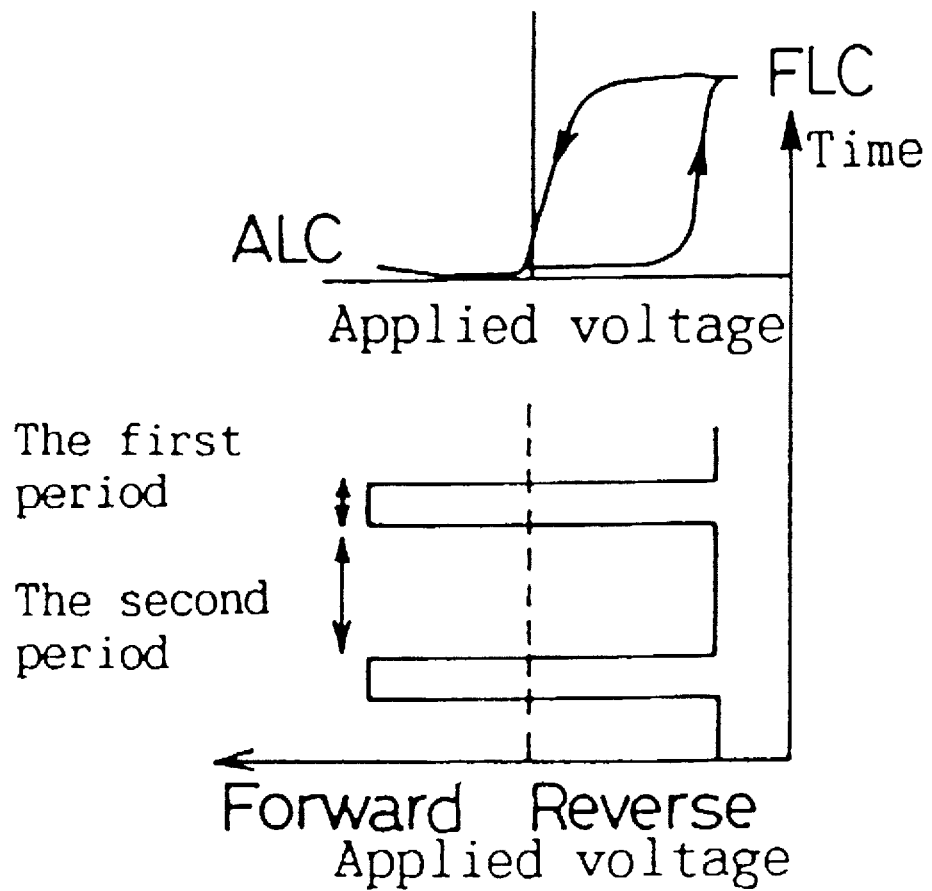
FIG. 4 illustrates the reflection characteristic of an antiferroelectric liquid crystal with respect to the asymmetrically applied pulse voltage of the present invention.
Figure 5:
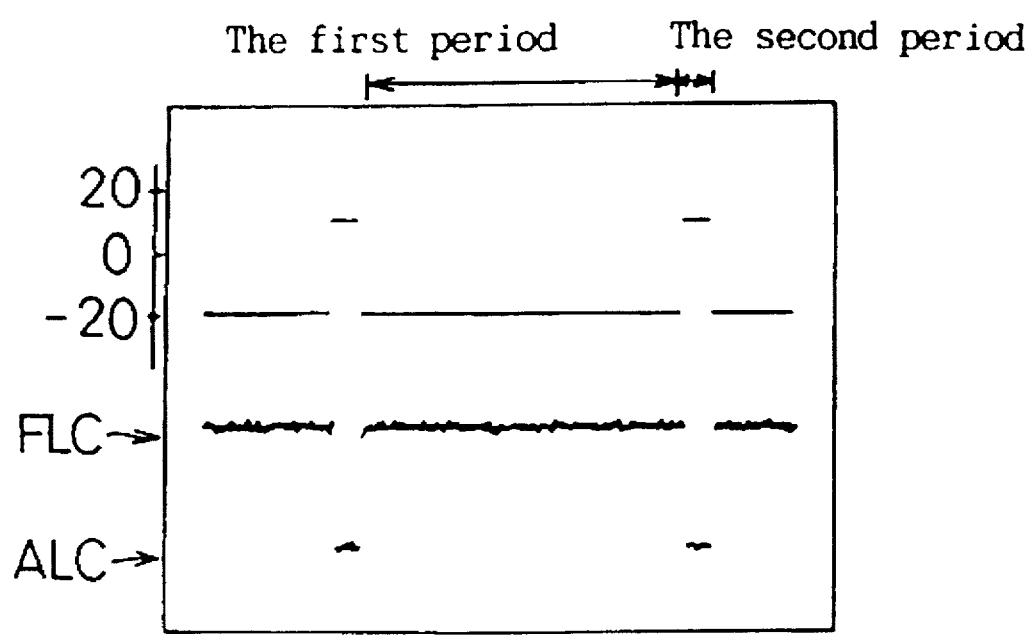
FIG. 5 illustrates the time change of the asymmetrically applied pulse voltage and the reflection ratio of the antiferroelectric liquid crystal of the present invention.
Figure 6:
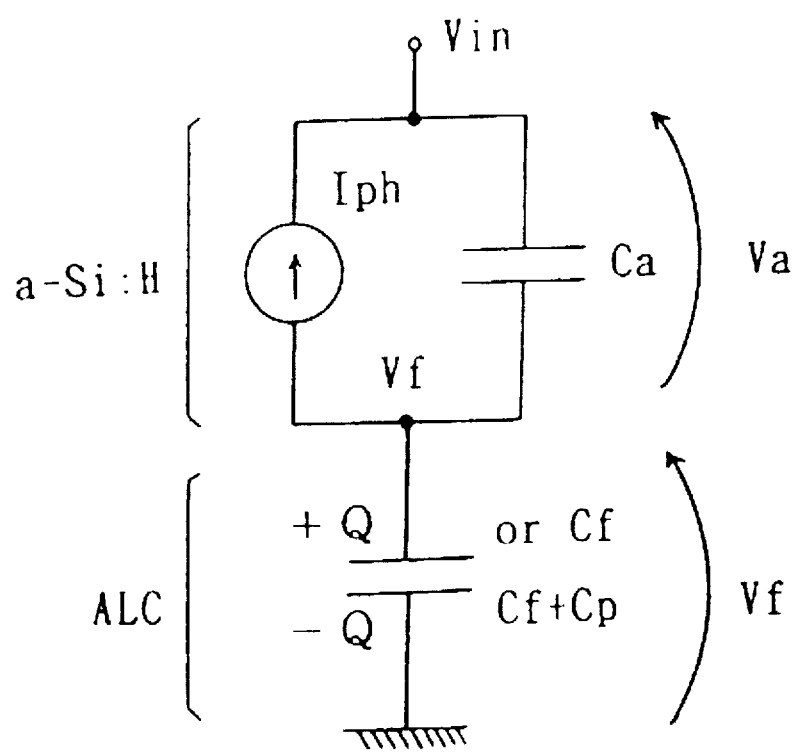
FIG. 6 is a diagram of the equivalent circuit of one embodiment of the spatial light modulator of the present invention.
Figure 7:
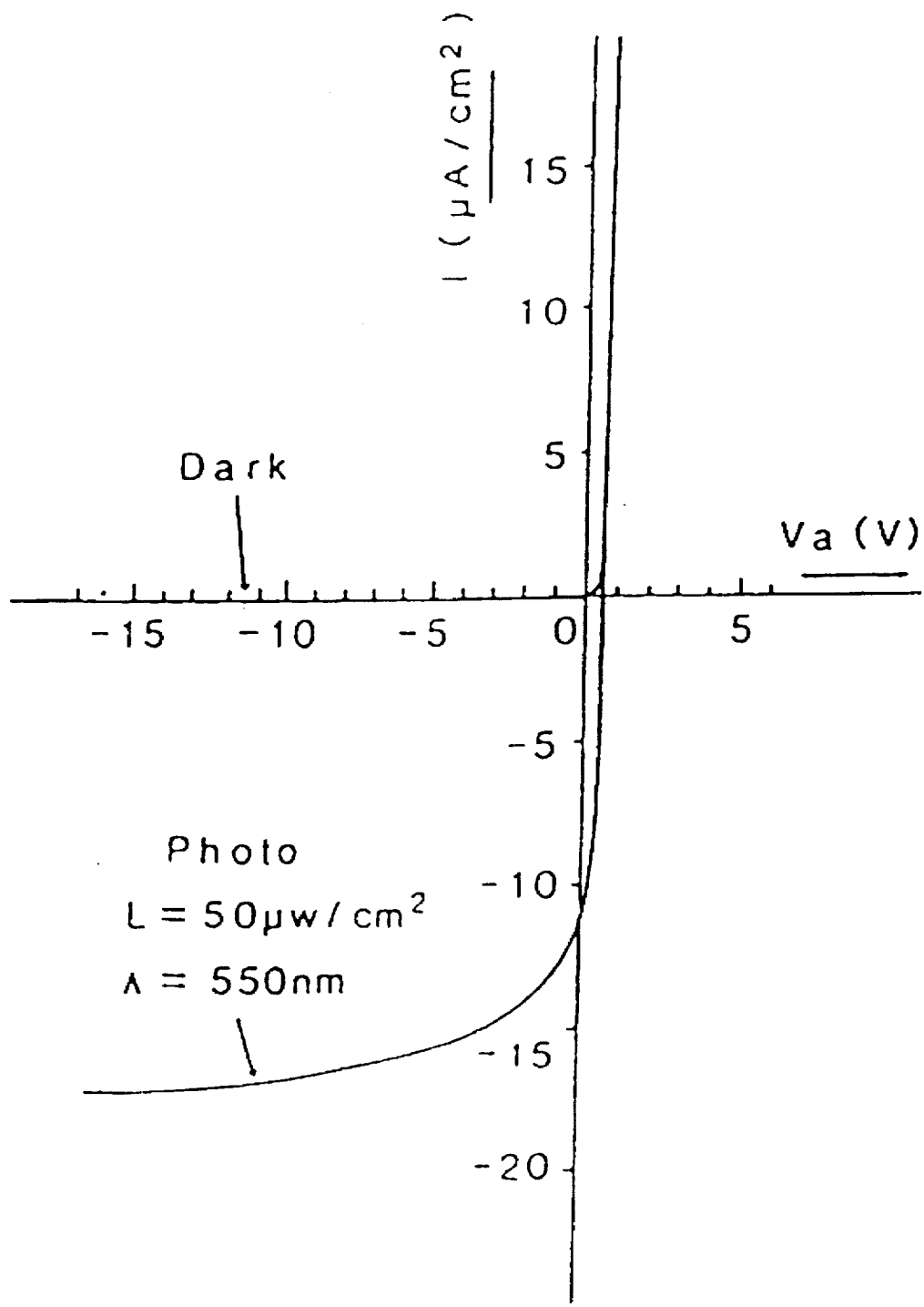
FIG. 7 illustrates the current rectifying characteristic of an a-Si:H photoconductor of one embodiment of the present invention.
Figure 8:
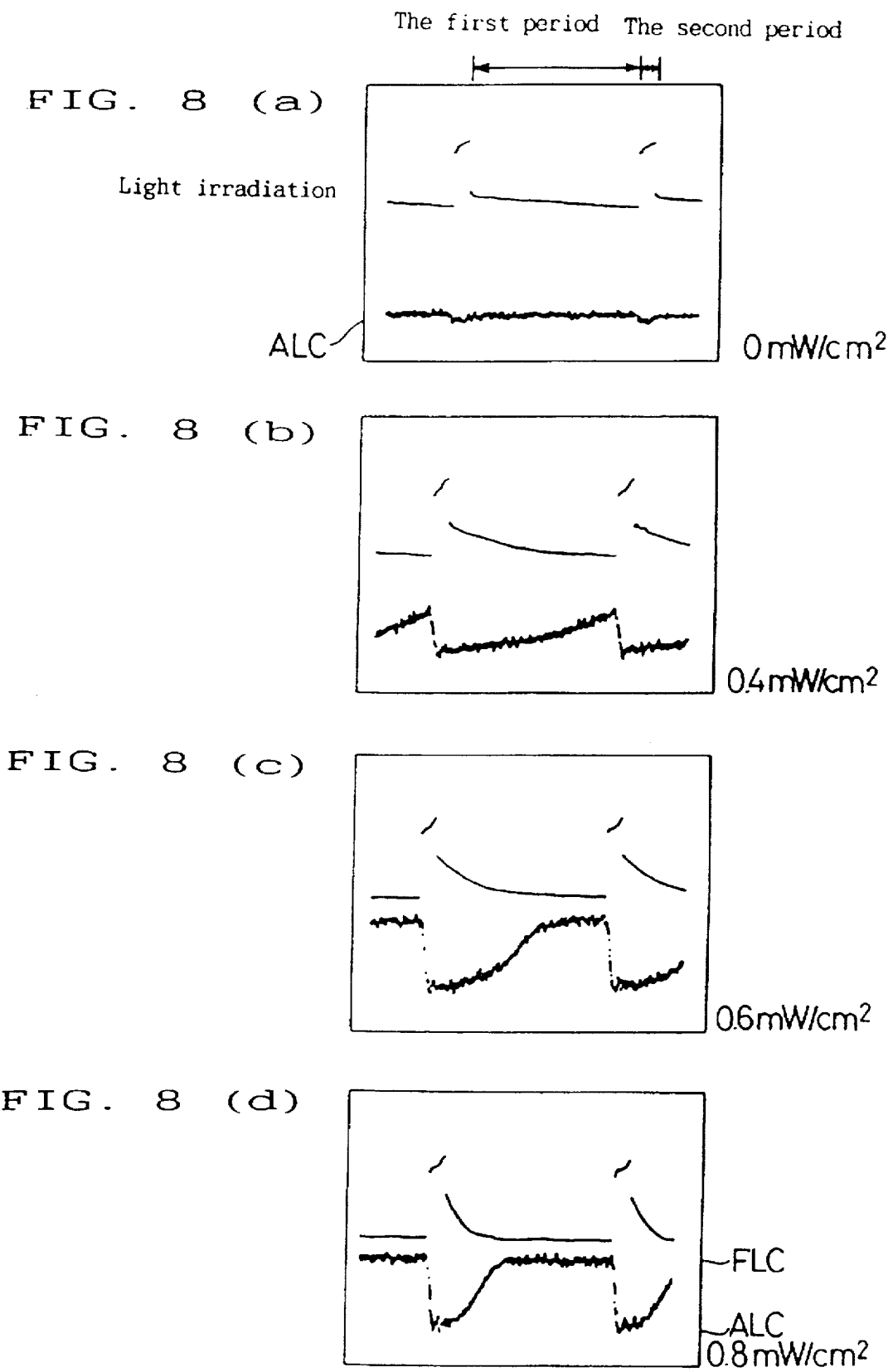
FIGS. 8(a)–8(d) illustrate the time change of the voltage applied to the liquid crystal layer and the reflection ratio of one embodiment of the present invention.

A voltage 116 as illustrated in FIG. 4 was applied to the transparent conductor films (transparent electrodes) 102, 114 formed on the surface of transparent insulating substrates 101, 115 respectively in the plane toward the liquid crystal layer 118 to drive the device 117.

Examples of the photoconductor layer material include; compound semiconductors such as CdS, CdTe, CdSe, ZnS, ZnSe, GaAs, GaN, GaP, GaAlAs, InP; amorphous semiconductors such as Se, SeTe, AsSe; polycrystalline or amorphous semiconductors such as Si, Ge, $Si_{1-x}C_x$, $Si_{1-x}Ge_x$, $Ge_{1-x}C_x$ (0<X<1); and organic semiconductors such as (1) phthalocyanine pigments (hereinafter abbreviated Pc) such as nonmetallic Pc, XPc (X=Cu, Ni, Co, TiO, Mg, $Si(OH)_2$, etc.), AlClPcCl, TiOClPcCl, InClPcCl, InClPc, InBrPcBr, (2) azo coloring matters such as mono azo coloring matters and dis azo coloring matters, (3) perylene pigments such as perylenic acid anhydride and perylene imide, (4) indigoid dyes, (5) quinacridone pigments, (6) polycyclic quinones such as anthraquinone and pyrene-quinone, (7) cyanin coloring matters, (8) xanthene dyes, (9) charge-transfer complexes such as PVK/TNF, (10) eutectic complexes formed from a pyrylium salt dye and a polycarbonate resin, (11) azulenium salt compound.

In the case when the amorphous semiconductor such as amorphous Si (hereinafter abbreviated a-Si), amorphous Ge (hereinafter abbreviated a-Ge), amorphous $Si_{1-x}C_x$ (hereinafter abbreviated a-$Si_{1-x}C_x$), amorphous $Si_{1-x}Ge_x$ (hereinafter abbreviated a-$Si_{1-x}Ge_x$), amorphous $Ge_{1-x}C_x$ (hereinafter abbreviated a-$Ge_{1-x}C_x$) is used for the photoconductor layer 104, it is preferable to contain hydrogen or a halogen element in the amorphous semiconductor. It is also preferable to contain oxygen or nitrogen in the amorphous semiconductor in order to lower the dielectric constant and increase the resistance of the photoconductor layer. It is further preferable to dope the amorphous semiconductor with p-type impurities such as B, Al, Ga or n-type impurities such as P, As, Sb in order to control the resistance. By laminating such amorphous materials doped with impurities, a p/n, p/i, i/n or p/i/n junction is formed. By forming a depletion layer in the photoconductor layer, the dielectric constant, dark resistance and the polarity of the operating voltage can be controlled. Alternatively, a depletion layer can be formed not only with a junction comprising amorphous material but also with a hetero-junction by laminating layers of two or more kinds selected from the above-mentioned semiconductor materials.

FIG. 2 is an embodiment of a structure comprising multi-layered thin films of different dielectric constants 202 located between the photoconductor layer and the liquid crystal layer. The dielectric multi-layer 202 is designed to reflect the visible light in the reading light. If a scant light is leaked from the reading light to pass through the dielectric multi-layer film 202, the light is absorbed by the blocking film 201 so as not to be incident on the photoconductor 105.

Concrete examples will be described hereinafter.

EXAMPLE 1

Figure 10:
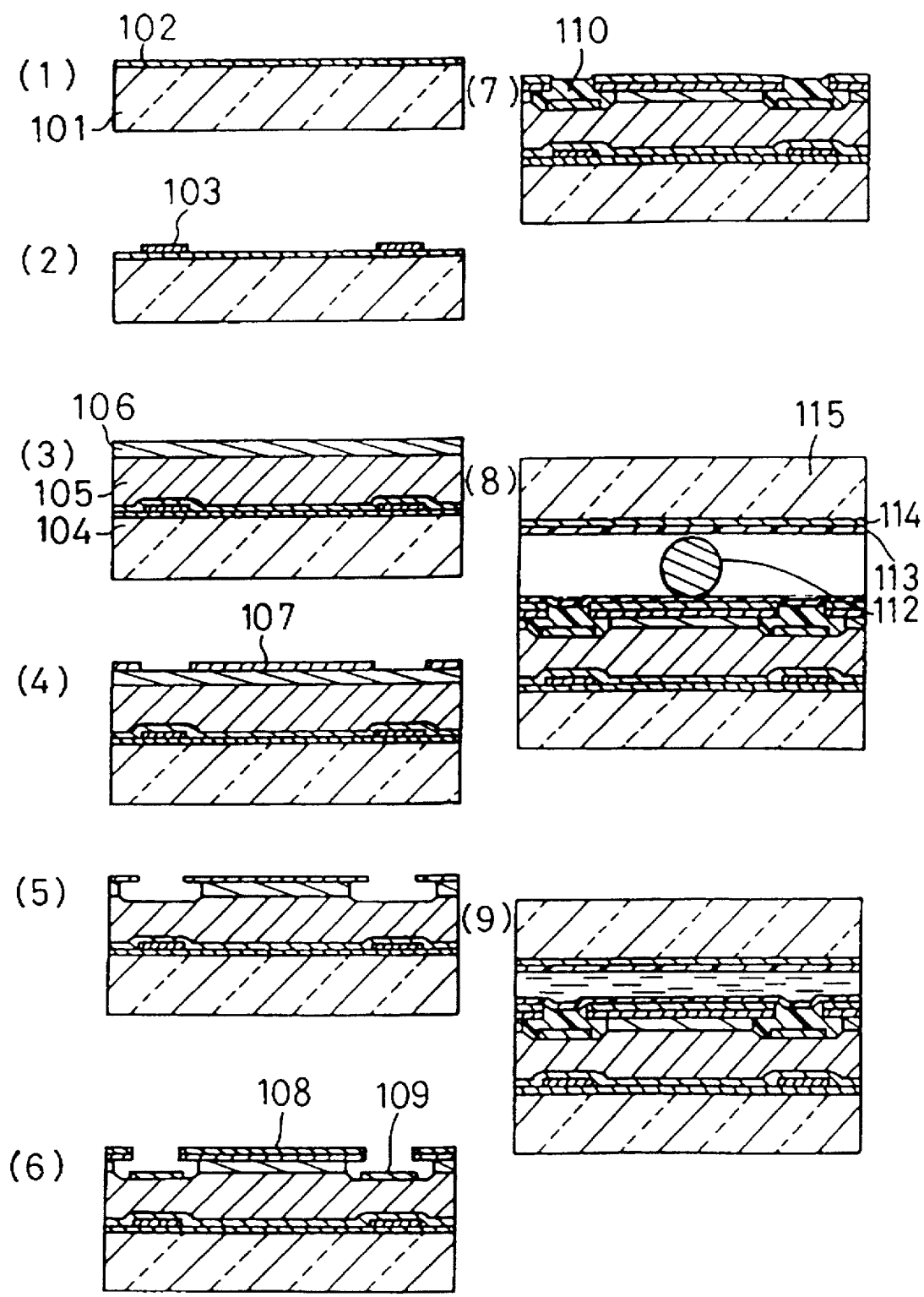
FIG. 10 illustrates the production process of the spatial light modulator of one embodiment of the present invention.

The spatial light modulator illustrated in FIG. 1 was produced by the processes described in FIG. 10.

(1) On the surface of a glass substrate 101 having a size of 55 mm×65 mm×1.1 mm treated by optical polishing, an indium-tin oxide alloy film (hereinafter abbreviated ITO) of 100 nm thickness was formed by sputtering as the transparent conductor film 102.

(2) On the surface of the ITO transparent conductor film 102, a film of chromium (hereinafter abbreviated Cr) having 200 nm thickness was formed by electron-beam deposition, then input light blocking films 103 having 3.0 µm width were formed by a common photolithograpy method. (3) Then three layers, namely, a p-type a-Si:H layer 104 having 50 nm thickness doped with 100 ppm of boron, an i-type a-Si:H layer (photoconductor) 105 having 1.7 µm thickness without an impurity and a n-type a-Si:H layer 106 having 300 nm thickness doped with 1000 ppm of phosphorus were laminated successively by plasma CVD (chemical vapor deposition) to form a photoconductor with a diode structure. (4) Cr film was deposited on the overall surface by 200 nm thickness and then 2000×2000 (total 4 million) apertures each having a size of 23.5 µm×23.5 µm and two-dimentionally arranged at a pitch of 25 µm were formed by lithography, thereby forming Cr thin films 107 at the apertures. Each Cr thin film 107 corresponded to a pixel, respectively. The effective region of a Cr thin film is 50 mm×50 mm. Input light blocking films 103 were designed to be located at an inter-pixel portion between Cr pixels 107. The thickness of the Cr film herein was determined in the range of 20 to 500 nm.

(5) After etching the a-Si:H layer 0.5 µm in the vertical direction using the Cr pixels as etching masks by reactive ion etching, the layer was further etched 0.1 µm in the horizontal direction by the chemical dry etching using a $CF_4$ and oxygen gas mixture which enables isotropical etching to form a groove having flaws between the Cr pixels. By removing the n-type a-Si:H layer at least in the portion between pixels as the groove, electric charge leakage between adjacent pixels can be prevented. The groove structure can be formed solely by etching depending on etching conditions.

(6) Aluminum film (hereinafter abbreviated Al) was deposited on the overall surface in the range of 20 to 300 nm thickness by electron beam deposition. The Al film formed on the Cr pixel 108 serves as the reflection layer having a high reflectance. And the Al film formed at the bottom of the groove 109 serves as the input light blocking film which prevents the reading light from being incident to the photoconductor from the inter-pixel portions.

It is also possible to form a Cr film of 150 nm thickness and an Al film of 150 nm thickness consecutively so that the Al film as the output light blocking film 109 prevents the diffusion of the light into the a-Si:H layer underneath.

(7) A high molecular film having dispersed carbon particles was coated by 2 µm thickness. In this process, the groove part was filled with the high molecular film and at the same time the surface of the pixel was covered as well. By the reactive ion etching with oxygen, the high molecular film was removed evenly from the surface until the Al film on the pixel was surfaced. As a consequence, only the groove portion in the inter-pixel portions was filled with the high molecular film 110. By absorbing the incident light in the inter-pixel portions, this portion prevents the reading light from being incident to the a-Si:H layer which is not covered with a light blocking film. Further, the high molecular film in the inter-pixel portions provides black matrix in display to lower the reflection light from inter-pixel portions and always display in black.

(8) A polyimide film 111 having 50 nm thickness was formed as the orientation film. Similarly, onto the glass substrate 115 with ITO 114 which serves as the opposing substrate, polyimide film 113 having 50 nm thickness was formed. Then rubbing treatment was applied to the both substrates by rolling with a roller covered with a special nylon cloth. The rubbing was applied to the same direction on the both substrates. Then onto one substrate, spacers 112 comprising silicon oxide having 1.5 µm particle size were sprinkled to secure the thickness of the liquid crystal film. On the perimeter of the other substrate, sealing resin was screen printed to adhere the substrates to form liquid crystal cell.

(9) After placed in a vacuum apparatus to reduce the pressure, the liquid crystal cell was heated at 120° C. and then an antiferroelectric liquid crystal "CS-4000" produced by CHISSO CORPORATION was injected into the cell by capillarity.

Figure 11:
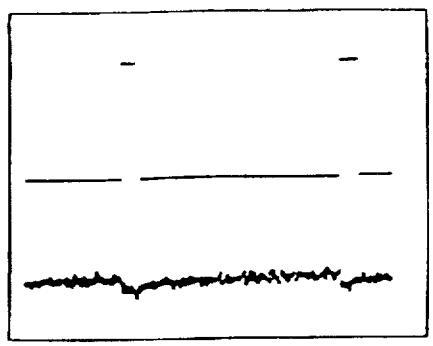
FIGS. 11(a)–11(d) illustrate the time response characteristic of the reflected light when the writing light intensity is changed and applied to the spatial light modulator of one embodiment of the present invention.
Figure 11:
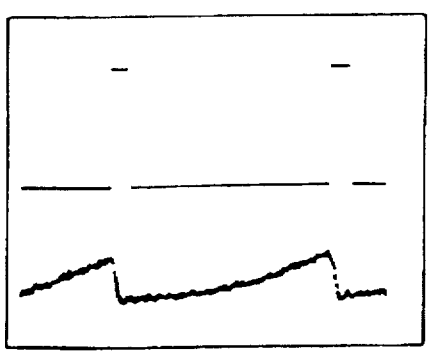
Figure 11:
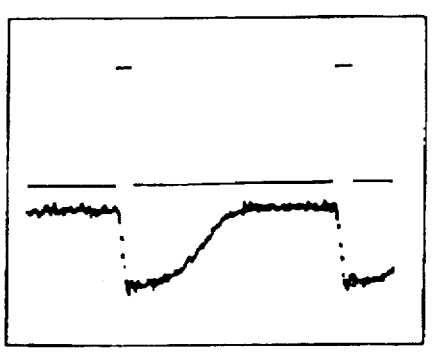
Figure 11:
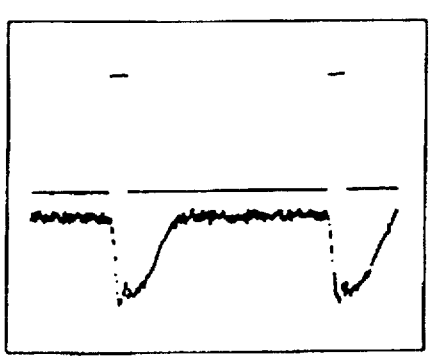

FIG. 11 illustrates the relationship between the writing light intensity of the spatial light modulator 117 irradiated to the light conductor and the time response characteristic of the reflected light. Driving was conducted by applying a forward bias voltage of +10 V for 0.1 msec for erasure in the second applying time and the reverse bias voltage of −20 V for 1.1 msec for writing in the first applying time. Therefore the driving frequency was 833 Hz.

When the polarization orientation of the polarizer is set to be the same as the rubbing orientation, black display is indicated in the antiferroelectric phase. When the writing light intensity is changed from 0 to 0.8 mW/cm$^2$, the reflected light intensity increased as the writing light intensity increases.

Figure 12:
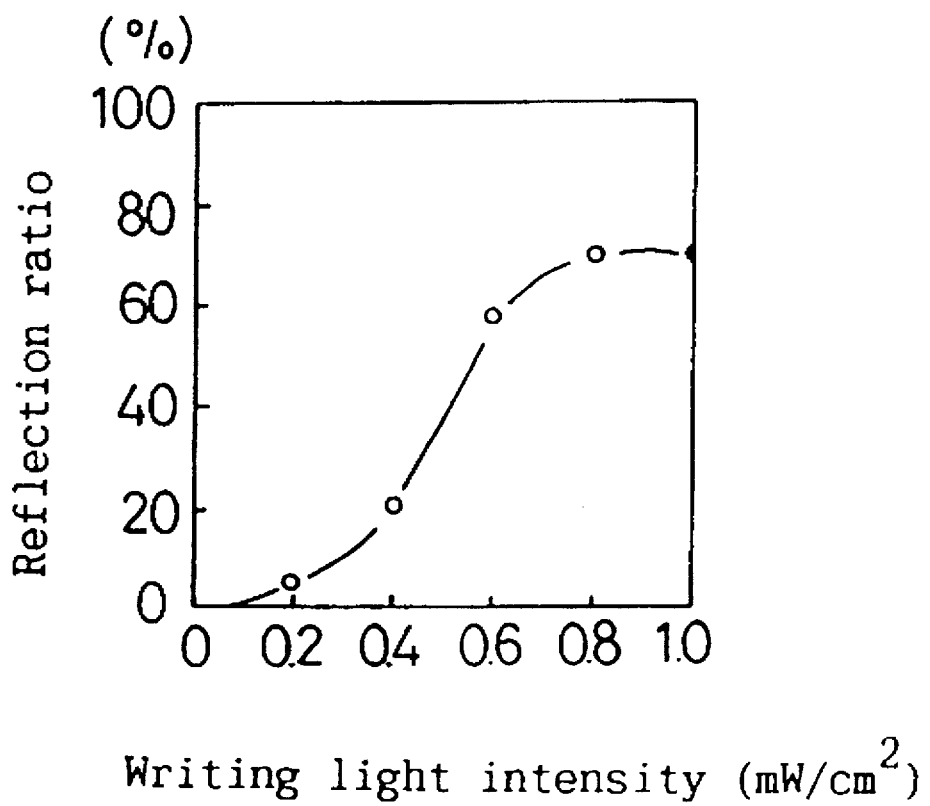
FIG. 12 illustrates the change of the output light defined by the time average of the reflected light intensity with respect to the writing light intensity of one embodiment of the present invention.

FIG. 12 illustrates the change of the output light with respect to the writing light intensity when the output light is defined by the time average of the reflected light intensity. It shows the half-tone display with the writing light intensity from 0 to 0.8 mW/cm$_2$ controlling the reflection ratio from 0% to 80%.

Because the maximum applied voltage at the light writing is 20V and the time necessary for the phase transition at this electric field strength is 0.3 msec, the maximum reflection ratio becomes 80%. In the duration of 1.1 msec, the phase transition time is disadvantageous for the white display. A maximum contrast ratio of 200 or over was secured.

Figure 13:
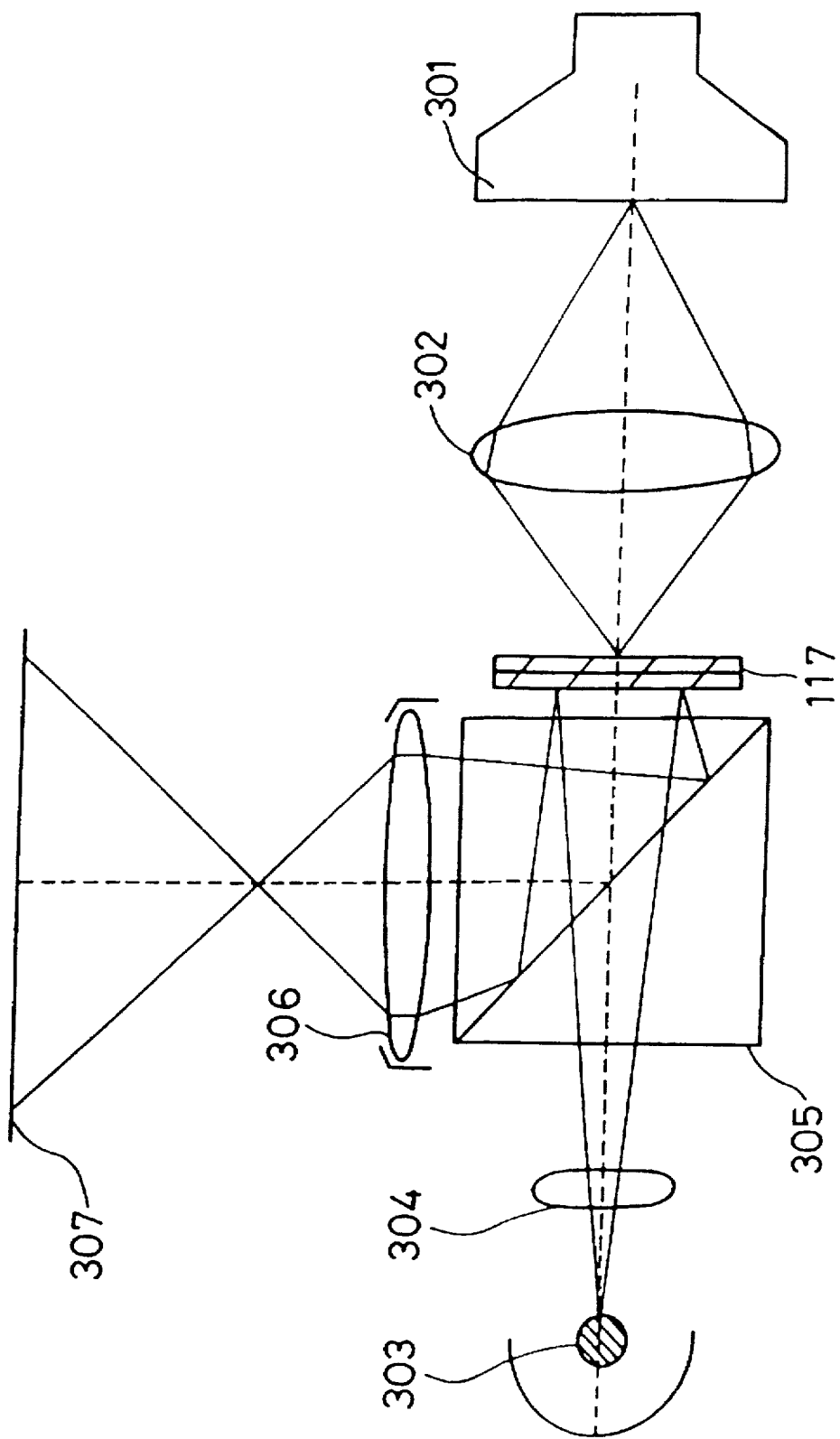
FIG. 13 illustrates the system of a projection television set comprising a spatial light modulator of one embodiment of the present invention.

With this spatial light modulator 117, a projection television system was designed. A schematic view of the system is illustrated in FIG. 13. To input a television dynamic picture with frame frequency of 60 Hz as the light information, the light from a cathode ray tube with a diagonal size of 7 inches 301 (hereinafter abbreviated CRT) was concentrated via lens 302 to the effective region of 5 cm×5 cm size of the spatial light modulator 117. As the fluorescent substance of the CRT, a green fluorescent substance P1 which coincides with a sensitive wavelength of the a-Si:H layer having an afterglow time of approximately 10 msec was chosen. A metal halide lamp 303 of 250 W, having luminous efficacy of 70 lm/W was used as the reading light source and set to be even and with a high luminance with respect to the spatial light modulator 117 by means of the capacitor lens 304. After irradiating a reading light which was linearly polarized by the polarizing beam splitter 305 to the spatial light modulator 117 to be modulated, the modulated reflected light was magnified with the projection lens 306 and image was formed on the screen 307. A magnified picture of diagonal 70 inch size was displayed on the screen. A green dichroic filter was located just behind a light source 303 with an infrared ray cut filter and an ultraviolet ray cut filter. The polarized beam splitter 305 having characteristic to match green color was used. A luminous flux of 250 lm reached on the screen 307 providing the light utilization efficacy of 1 lm/W. The contrast ratio on the screen exceeded 100:1. The indicated dynamic picture had a good half-tone display without afterimage.

A projection system having a liquid crystal device by thin film transistor drive instead of CRT 301 was produced as the means for light writing. Since the numeral aperture of the liquid crystal device is 30%, the luminance on the screen was hindered compared to the CRT writing, but the system was downsized.

EXAMPLE 2

The spatial light modulator 203 illustrated in FIG. 2 was produced in the processes described hereinafter. On the surface of glass substrate the same as the Example 1 having a size of 55 mm×65 mm×1.1 mm treated by optical polishing, an ITO transparent conductor film 102 of 100 nm thickness was formed by sputtering as the transparent conductor film. Then three layers, namely, a p-type a-Si:H layer 104 having 50 nm thickness doped with 100 ppm of boron, an i-type a-Si:H layer 105 having 1.7 µm thickness without an impurity and a n-type a-Si:H layer 106 doped with 1000 ppm of phosphorus were laminated successively by plasma CVD to form a photoconductor with a diode structure.

Then CdSe layer having 500 nm thickness was formed thereon as the light blocking layer 201 by deposition. The CdSe layer absorbs visible light. Then a conductor multi-layer film 202 comprising a titanium oxide layer and a silicon oxide layer was formed by sputtering. The reflected spectrum had a reflection ratio of more than 99.9% with respect to a wavelength including green. A polyimide film having 50 nm thickness was formed as the orientation film 111 on the conductor film the same as the Example 1.

By the same procedure as the Example 1, a liquid crystal cell was formed to provide a spatial light modulator 203 having an antiferroelectric liquid crystal.

By setting the spatial light modulator device in a projection television system used in the Example 1 to output a dynamic picture.

A luminous flux of 250 lm reached to the screen to have the light utilization efficacy of 1 lm/W. The contrast ratio on the screen exceeded 100:1.

As heretofore mentioned, a spatial light modulator comprising a photoconductor and a liquid crystal layer of the present invention enables the reproduction of a light-input dynamic picture with a half-tone display having a wide viewing angle and high-speed response. Further, a stable and reliable device can be provided. A projection television set for light writing comprising the device of the present invention provides an image having a high luminance, a high resolution and high contrast ratio in a large image plane.

We claim:

1. A spatial light modulator comprising:
   a photoconductor having current rectifying function;
   a liquid crystal layer having an antiferroelectric phase as a phase of the liquid crystal;
   a conductor reflection layer comprising a multilayer of thin films having different conductivities located between said photoconductor and said liquid crystal layer and
   a pair of transparent electrodes,
   wherein said photoconductor and said liquid crystal layer are located between said transparent electrodes.

2. The spatial light modulator according to claim 1, further comprising a plurality of small metal thin films, electrically isolated from each other, between said photoconductor and said liquid crystal layer.

3. The spatial light modulator according to claim 2, wherein said photoconductor comprises a groove part in the portion not having said small metal thin films thereon, and a second metal thin film is formed at the bottom of said groove part.

4. The spatial light modulator according to claim 3, wherein an insulating film is disposed under said second small metal thin film at the bottom of said groove part.

5. The spatial light modulator according to claim 2, wherein said groove part located between the small metal thin films of the photoconductor has a flaw part at which said metal thin films project toward inter-pixel portions.

6. The spatial light modulator according to claim 1, wherein a polarizer and an analyzer are located orthogonally.

7. The spatial light modulator according to claim 1, wherein the photoconductor having a current rectifying function is a layer comprising amorphous silicon (a-Si:H).

8. The spatial light modulator according to claim 7, wherein the layer of amorphous silicon (a-Si:H) is a layer of i-type a-Si:H doped with boron.

9. A spatial light modulator comprising:
   a photoconductor having current rectifying function;
   a liquid crystal layer having an antiferroelectric phase as a phase of the liquid crystal; and
   a pair of transparent electrodes,
   wherein said photoconductor and said liquid crystal layer are located between said transparent electrodes,
   wherein said liquid crystal layer having the antiferroelectric phase as a phase of the liquid crystal is in the antiferroelectric phase when a voltage is lower than a higher threshold value as the voltage gradually increases;
   the phase of said liquid crystal changes from the antiferroelectric phase to the ferroelectric phase due to phase transition when the voltage becomes higher than the higher threshold value of the applied voltage as the voltage gradually increases;
   the phase of said liquid crystal changes from the ferroelectric phase to the antiferroelectric phase due to phase transition when the voltage becomes lower than a lower threshold value as the voltage gradually decreases; and
   said phase transition occurs similarly when the voltage is applied with a reversed polarity,
   wherein a white display is shown in a first period, in which the voltage is greater than the higher threshold value to cause the phase transition from the antiferroelectric phase to the ferroelectric phase, a black display is shown in a second period, in which the voltage less than the lower threshold value to cause the phase transition from the ferroelectric phase to the antiferroelectric phase.

10. The spatial light modulator according to claim 2, wherein the voltage is controlled by light irradiation.

11. The spatial light modulator according to claim 10, further comprising a light input means with a light intensity sufficient to provide a voltage sufficient to cause the phase transition from the antiferroelectric phase to the ferroelectric phase in the period in which the voltage is applied to the polarity reverse to the current rectifying characteristic of the photoconductor when light is irradiated to said photoconductor of said spatial light modulator.

12. A liquid crystal display device comprising a spatial light modulator which has a photoconductor having a current rectifying function, a liquid crystal layer having an antiferroelectric phase as a phase of the liquid crystal placed between a pair of transparent electrodes, a display device to input light to the photoconductor and a power source to apply driving voltage to the spatial light modulator, and
   a conductor reflection layer comprising a multilayer of thin films having different conductivities between said photoconductor and said liquid crystal layer.

13. The liquid crystal display device according to claim 12, comprising a means to input light so that a frequency of the driving voltage of the spatial light modulator becomes greater than a display frequency of the display.

14. The liquid crystal display device according to claim 12, wherein the display device to input light is at least one selected from the group consisting of a liquid crystal display device with thin film transistor drive and a cathodray tube display device.

15. The liquid crystal display device according to claim 12, wherein the liquid crystal orientation state to apply minimum reflection light intensity is the antiferroelectric phase when the linearly polarized light from a polarizing plate which is polarized in a certain direction is irradiated and incident on the liquid crystal layer of the spatial light modulator, and the reflected light from the spatial light modulator is read via the polarizing plate located to orient the reflected light orthogonal to the polarizing plate.

16. The liquid crystal display device according to claim 12, further comprising a means to display area gradation by increasing the ratio of the ferroelectric phase in the mixed phase of the antiferroelectric phase and the ferroelectric phase as the light intensity of the light irradiation to the photoconductor of the spatial light modulator increases.

17. The liquid crystal display device according to claim 12, further comprising means to form an image on the screen by irradiating a television dynamic picture from a cathode ray tube via a lens and irradiated to the effective area of the spatial light modulator, irradiating the light from the reading light source via a condenser lens to the polarizing beam splitter, irradiating the light linearly polarized by the polarizing beam splitter to the spatial light modulator, and magnifying the modulated reflection light a via projection lens.

18. A spatial light modulator comprising:

a photoconductor having current rectifying function:

a liquid crystal layer having an antiferroelectric phase as a phase of the liquid crystal; and a pair of transparent electrodes, wherein said photoconductor and said liquid crystal layer are located between said transparent electrodes, wherein said liquid crystal layer having the antiferroelectric phase as a phase of the liquid crystal is in the antiferroelectric phase when a voltage is lower than a first higher threshold value;

the phase of said liquid crystal changes from the antiferroelectric phase to the ferroelectric phase due to phase transition when the voltage becomes higher than the first higher threshold value of the applied voltage as the voltage gradually increases;

the phase of said liquid crystal changes from the ferroelectric phase to the antiferroelectric phase due to phase transition when the voltage becomes lower than a second lower threshold value as the voltage gradually decreases; and said phase transition occurs similarly when the voltage is applied with a reversed polarity, and wherein the voltage applied between the transparent electrodes has a unit cycle comprising a writing voltage period in which a voltage sufficient to cause phase transition of the liquid crystal layer from the antiferroelectric phase to the ferroelectric phase is applied to the polarity reverse to the current rectifying characteristic of the photoconductor and an erasing voltage period in which a voltage sufficient to cause phase transition of the liquid crystal layer from the ferroelectric phase to the antiferroelectric phase is applied to the polarity forward to the current rectifying characteristic of the photoconductor.

19. A liquid crystal display device comprising a spatial light modulator which has a photoconductor having a current rectifying function, a liquid crystal layer having an antiferroelectric phase as a phase of the liquid crystal placed between a pair of transparent electrodes, a display device to input light to the photoconductor and a power source to apply driving voltage to the spatial light modulator wherein a white display is shown in a first period, in which the voltage is greater than a first higher threshold value to cause the phase transition from the antiferroelectric phase to the ferroelectric phase, a black display is shown in a second period, in which the voltage is less than a second lower threshold value to cause the phase transition from the ferroelectric phase to the antiferroelectric phase.

20. A liquid crystal display device comprising a spatial light modulator which has a photoconductor having a current rectifying function, a liquid crystal layer having an antiferroelectric phase as a phase of the liquid crystal placed between a pair of transparent electrodes, a display device to input light to the photoconductor and a power source to apply driving voltage to the spatial light modulator wherein the voltage applied between the transparent electrodes has a unit cycle comprising a writing voltage period in which a voltage sufficient to cause phase transition of the liquid crystal layer from the antiferroelectric phase to the ferroelectric phase is applied to the polarity reverse to the current rectifying characteristic of the photoconductor and an erasing voltage period in which a voltage sufficient to cause phase transition of the liquid crystal layer from the ferroelectric phase to the antiferroelectric phase is applied to the polarity forward to the current rectifying characteristic of the photoconductor.

\* \* \* \* \*